INVENTOR.
Henry L. Stadler
BY
John R. Faulkner,
Keith L. Zerschling
ATTORNEYS

INVENTOR.
Henry L. Stadler
BY John R. Faulkner,
Keith L. Zerschling
ATTORNEYS

INVENTOR.
Henry L. Stadler
BY John R. Faulkner,
Keith L. Zerschling
ATTORNEYS

United States Patent Office 3,448,348

Patented June 3, 1969

3,448,348

TRANSDUCER UTILIZING ELECTRICALLY POLARIZABLE MATERIAL

Henry L. Stadler, Ann Arbor, Mich., assignor to Ford Motor Company, Dearborn, Mich., a corporation of Delaware Continuation-in-part of application Ser. No. 437,384, Mar. 5, 1965. This application Aug. 1, 1968, Ser. No. 749,504

Int. Cl. H01g 9/04

U.S. Cl. 317—231 9 Claims

ABSTRACT OF THE DISCLOSURE

A transducer utilizing a body of electrically polarizable material in which the electrical polarization of the material can be altered and in which a thin layer of metal has a surface positioned in engagement with a surface of the body of electrically polarizable material. Means are coupled to the body for altering the magnitude of polarization of the body in a direction substantially perpendicular to the surface of the thin layer of metal. The electron concentration at the surface of the thin layer of metal positioned against the body is responsively altered upon altering the magnitude of polarization of the body in the direction substantially perpendicular to the surface of the thin layer of metal. This action alters certain physical properties of the thin layer of metal including the electrical resistivity, the transmission and reflectance of light, the critical temperature and magnetic field for the transition from normal to superconducting states in a metal capable of superconductivity, the Hall voltage, the Mossbauer effect and the Curie temperature of a metal that is a ferromagnet.

This application is a continuation in part of application Ser. No. 437,384 filed Mar. 5, 1965, in the name of Henry L. Stadler and assigned to the assignee of this invention which has become abandoned.

*Background of the invention*

It is known in the prior art to vary the electrical resistivity of a semiconductor material positioned on a ferromagnetic ceramic substrate by switching the electrical polarization of this substrate.

The above described prior art takes advantage of a known scientific phenomenon that when a thin layer of certain semiconductor materials is subjected to an electric field applied perpendicularly to the surface thereof, the electrical resistance of the layer can be varied by varying the electric field. In the prior art mentioned above, this varied electric field is produced by switching the polarization of a ferroelectric substrate on which the semiconductor material is deposited. The phenomenon described above depends upon the concept of having an electric field gradient throughout the thickness of the semiconductor material.

The present invention differs substantially from the above mentioned prior art in that it relates to the altering of the physical characteristics of a thin layer of metal deposited on a body of an electrically polarizable material. The altering of the physical characteristics are brought about by varying the density or electron concentration of electrons in the metal at the surface of the metal that is in contact with the body of the electrically polarizable material.

This is totally different from the prior art, since there can be no electrical field gradient throughout the thickness of a metal. A metal has a shielding effect and the field gradient through it, due to any electric field, is substantially minimal or zero.

The present invention provides a means for altering the electron density or concentration of electrons in a thin metal layer at its surface to alter various properties of the metal including its electrical resistivity. The altering of these properties may be used in a number of ways to produce usable devices, as will be described subsequently. Moreover, the invention is not limited to the use of ferroelectric material, but rather, includes the use of any material the electrical polarization of which can be varied. These materials include ferroelectric materials, pyroelectric materials and piezoelectric materials.

*Summary of the invention*

This invention relates to a transducer utilizing an electrically polarizable body of material having a surface on which a thin layer of metal is deposited. This results in a structure in which a surface of the thin layer of metal is positioned in engagement with the surface of the electrically polarizable body of material. Means are coupled to the body of electrically polarizable material for altering the magnitude of polarization of the body of material in a direction substantially perpendicular to the surface of the thin layer of metal. This action alters the electron concentration or density at the surface of the thin layer of metal thereby altering certain physical properties of this thin layer of metal.

The properties that may be altered include the electrical resistivity of the metal, the Hall voltage of the metal, the transmission and reflectance of light of the metal, the critical temperature and magnetic field for the transition from normal to superconducting states in a metal that is capable of superconductivity, the Curie temperature of a metal that is a ferromagnet and the Mossbauer effect of the metal.

The means coupled to the body of electrically polarizable material for altering the magnitude of polarization substantially perpendicular to the surface of the thin layer of metal may take many forms depending upon the composition of the electrically polarized material, i.e., whether it is a piezoelectric material, a ferroelectric material or a pyroelectric material.

If the material is ferroelectric, electrically conductive means, including the thin layer of metal, may be positioned in engagement with material to alter or change its polarization. The magnitude of this change may range from a complete switching of the polarization of the ferroelectric material from one direction to another to any degree of alterization or change that may be desired. This may be accomplished by suitable electrical circuits that will be described subsequently.

If the body of electrically polarizable material is a piezoelectric material, the electrical polarization may be changed or altered by applying a force to the body which alters the strain in the body. This altering of the strain in the body will produce the altering or change in the electric polarization of the material. If, on the other hand, the body of material is a pyroelectric material, the electrical polarization of the material may be altered by altering the temperature of the body. Moreover, the electrical polarization of a body of ferroelectric material also may be substantially altered by radiating it with radiation which may include neutrons, gamma rays, X-rays and electrons.

The ferroelectric materials that may be used in this invention include barium titanate, triglycine sulphate and potassium dihydrogen phosphate. Since all ferroelectric materials are also pyroelectric, the electrical polarization of the above mentioned materials may be altered or changed by a change in the temperature of the materials. Moreover, since all pyroelectric materials are piezoelectric, the pyroelectric materials may also have their electrical polarization changed or altered by pressure or forces applied along one or two axes.

The electrical polarization of a pyroelectric-nonferroelectric material, for example, lead titinate, may be altered or changed by changing its temperature or by a pressure applied to it. Similarly, the electrical polarization of a nonpyroelectric-piezoelectric material, for example, quartz, may be changed or altered by any force or strain except hydrostatic strain.

The transducer of the present invention may form many useful devices including, but not limited to, computer memory elements, optical display devices, amplifiers and microphones.

*Description of the preferred embodiment*

Figures 1, 2:
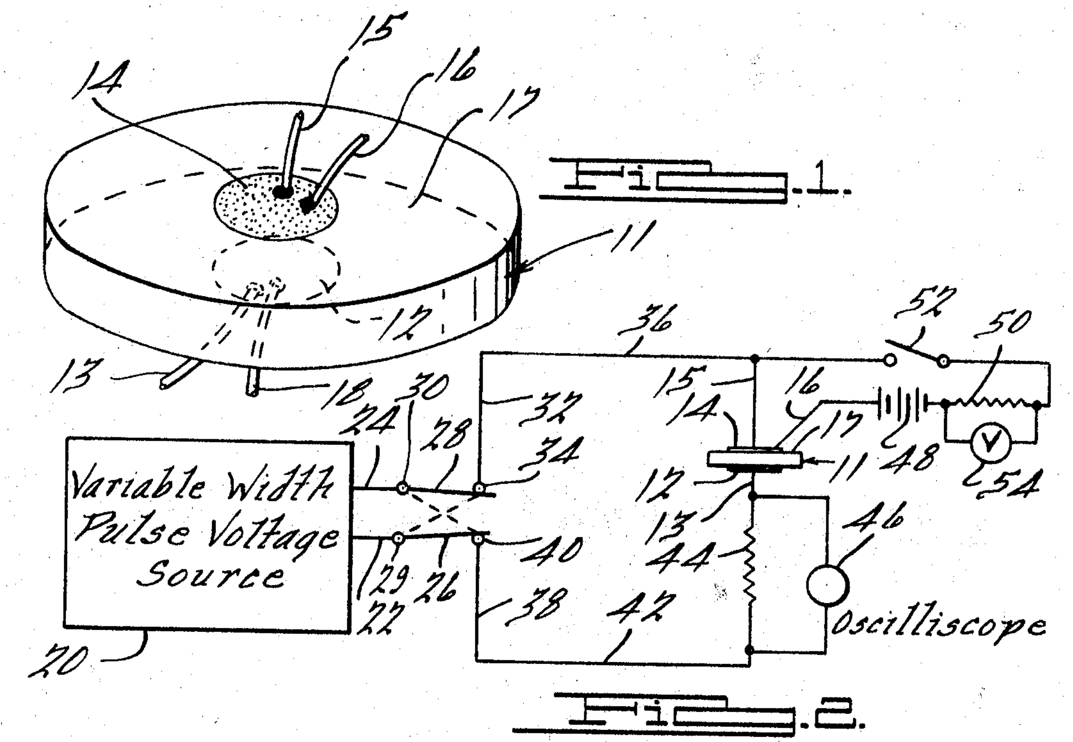
FIGURE 1 discloses one embodiment of the invention in which the electrically polarizable material is a ferroelectric material.
FIGURE 2 discloses the device of FIGURE 1 connected in an electrical circuit for altering or switching the electrical polarization of the ferroelectric material.

This invention depends for its operability upon the fact that an electrically polarizable material that has a net magnitude of polarization is capable of altering the properties of adjacent metals. If such a metal is brought into close proximity to the charged surface of a polarized body of electrically polarizable material, there will be an exchange of charge which will result in a change in the density or concentration of the charge carriers in the metal at its surface. This change in the density or concentration of charge carriers in the metal at its surface causes a corresponding change in other physical properties. Properties which may be so changed are:

(1) The electrical resistivity
(2) The Hall voltage
(3) The transmission and reflectance of light
(4) The critical temperature and magnetic field for the transition from normal to superconducting state
(5) The Curie temperature of a ferromagnet
(6) The Mossbauer effect Satisfactory experimental data have been produced on the items numbered (1) and (4) in the table above.

The amount of surface charge available from any given specimen of electrically polarizable material is obviously limited by the physical dimensions and shape of that specimen. To maximize the effect of the surface charge of the electrically polarizable material upon an adjacent metal, the mass of such metal should be limited. This is best accomplished by applying a very thin film or layer of metal upon the surface of the electrically polarizable material which is to be charged by polarization.

FIGURE 1 of the drawing depicts one typical and practical device for practicing the instant invention. A body of electrically polarizable material in the form of a ferroelectric slab 11 has a thickness between 0.01 and 0.001 cm. and is nearly 1 cm. long and wide. This ferroelectric slab may be barium titanate. On the bottom of the ferroelectric slab 11 is evaporated a conducting metal electrode 12 approximately 6 cm. in diameter to which is attached electrical contact wire 13. Electrode 12 is to be used for switching or altering the magnitude of polarization of the slab 11. On the top the thin metal film or layer 14 to be observed is evaporated upon the ferroelectric slab 11 directly opposite the electrode 12 and several wires 15 and 16 are attached. These wires 15 and 16 are used in the process for altering the magnitude of polarization in a direction substantially perpendicular to the surface of the film or layer 14 that is in contact with the upper surface 17 of the slab 11, as well as for measuring the properties of the metal. For certain applications which will be described subsequently a second wire 18 is attached to the electrode 12.

Ferroelectric materials such as barium titanate, triglycine sulphate and potassium dihydrogen phosphate may be considered to be the electrical analogue of ordinary ferromagnets. Below a certain critical temperature, called the Curie temperature, the atomic structure is distorted in such a way that each atomic unit cell resembles an electric dipole. Such a dipole exhibits a fixed positive and negative charge separated by a small distance. When all of the cells or electric dipoles are aligned parallel to one another throughout the volume of the ferroelectric material, the material is said to be completely polarized. The opposite surfaces of the material are observed to carry opposite surface charges. This is also true of a ferroelectric material which is only partially polarized, i.e. the polarization has a net value or magnitude in a given direction. This will be explained more fully subsequently. Since ferroelectrics are insulators there is no way for these surface charges to flow together and cancel one another. Thus, these surface charges remain until they attract oppositely charged ions from the ambient or from some other source of charge such as a battery. However, usually a polarized ferroelectric material below its Curie temperature degenerates into domains of opposite polarization.

The device shown in FIGURE 1 may be operated by connecting a voltage source to leads 15 and 13 as shown in FIGURE 2. The voltage source may take the form of a variable pulse width voltage source 20 having output leads 22 and 24 connected respectively to switch blades 26 and 28 that are pivotally mounted to the leads 22 and 24 at 29 and 30, respectively. A lead 32 is connected to fixed contact 34 and to a lead 36, while a lead 38 is connected to a fixed contact 40 and a lead 42. The lead 36 is connected to the thin film or layer of metal 14 positioned on surface 17 of the ferroelectric slab 11 through the lead 15, while the lead 42 is connected to conducting metal electrode 12 through a resistor 44 and the lead 13.

An oscilloscope 46 may be connected across the resistor 44 to indicate current flow through the resistor 44. A series circuit, comprising a battery or other source of direct current potential 48, a resistor 50 and a normally open switch 52, is connected at one end to the wire or lead 15 and at the other end to the lead or wire 16. A voltmeter 54 is connected across the resistor 50.

It is apparent that the slab of ferroelectric material 11 together with the electrodes 12 and 14 positioned on the opposite side thereof in effect form a capacitor. This capacitor can be fully charged in a given length of time and the electric polarization of the ferroelectric slab 11 may be switched from one direction of full or complete polarization by voltages applied from the variable width pulse voltage source 20.

Figure 3:
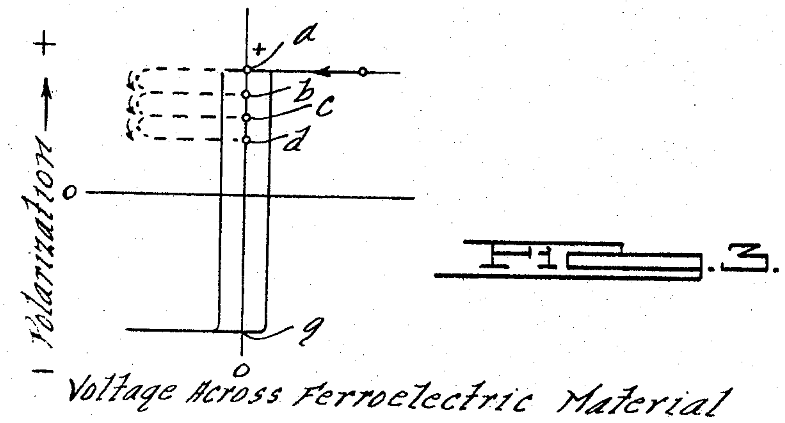
FIGURE 3 is a hysteresis curve of a ferroelectric material in which the magnitude of polarization is plotted against the voltage across the ferroelectric material.

If it is assumed that the ferroelectric slab 11 is polarized in the negative direction or state as shown on the hysteresis loop in FIGURE 3, the dipoles of the ferroelectric material will be aligned to provide a negative charge at the surface of the slab 11 in contact with the electrode 12 and a positive charge at the surface 17 in contact with the thin layer of metal 14. A negative voltage applied across the ferroelectric slab 11 in the direction from the electrode or thin layer of metal 14 to the electrode 12 will switch the ferroelectric slab 11 into a positive direction or state of polarization. In this state a positive charge will exist on the surface 17 on which the electrode or thin layer of metal 14 is positioned and a negative charge will exist on the surface of the ferroelectric slab 11 on which electrode 12 is positioned.

Figure 4:
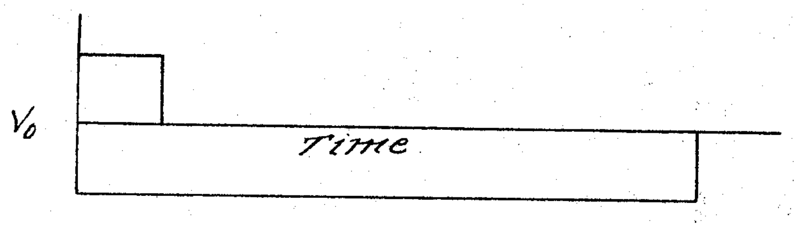
FIGURE 4 is a curve showing the voltage applied to the ferroelectric material by the circuit of FIGURE 2 plotted as a function of the time.

The variable width pulse voltage source will apply a negative voltage to the lead 32 and a positive voltage to the lead 38 when the switch blades 28 and 26 are in the solid line position. As a result a negative pulse on the line 32 of a magnitude and time width as shown in FIGURE 4 will apply a charge across the electrodes 14 and 12 via the charging current shown in FIGURE 5 to switch the polarization of the ferroelectric slab 11. The magnitude of the pulse and its width in time required to complete the switching action is, of course, dependent upon the material of the ferroelectric slab and its dimensions.

Figures 5, 6, 7, 8:
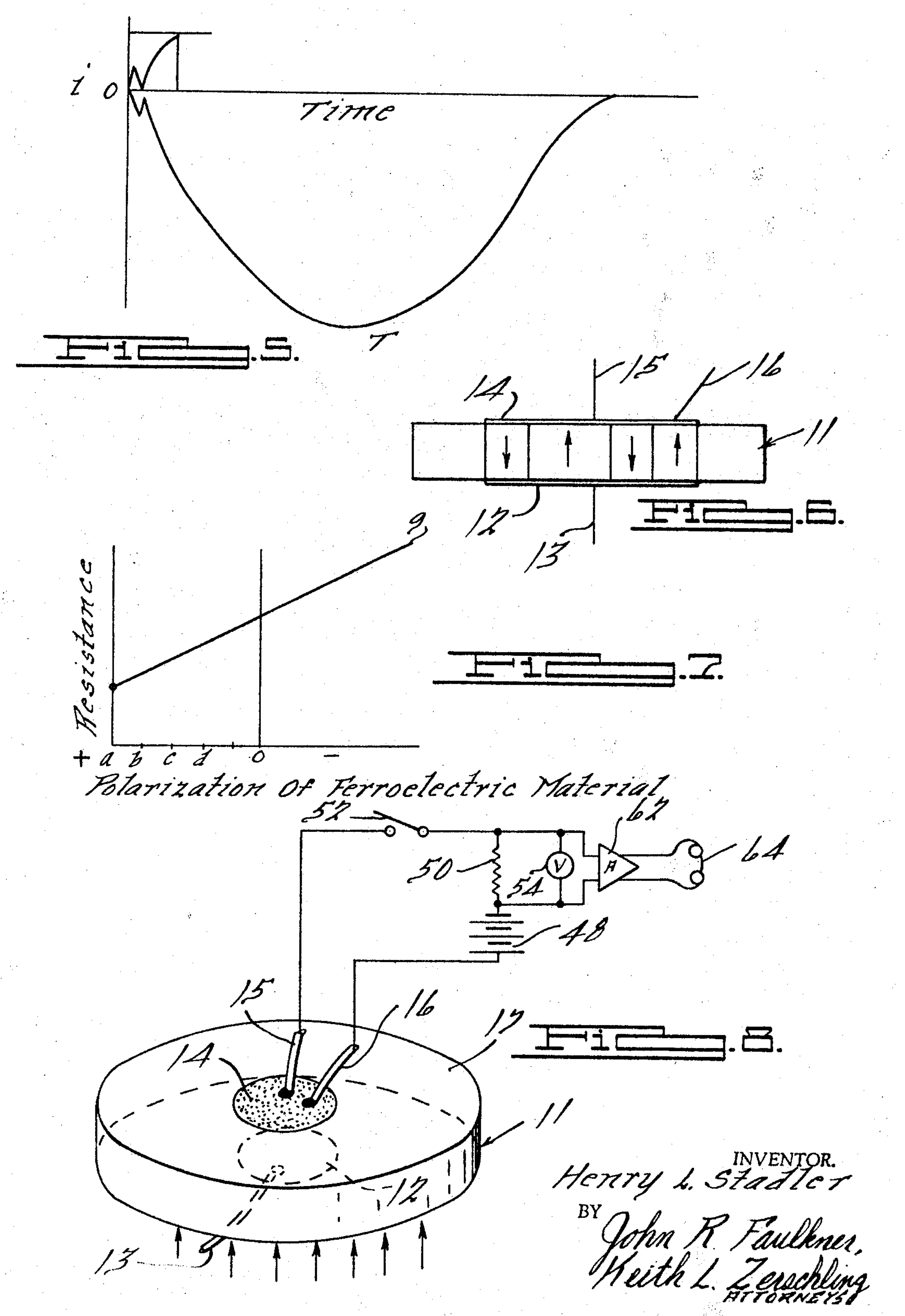
FIGURE 5 is a plot of the changing current to the electrodes of the ferroelectric material with respect to time that flows as a result of the voltages shown in FIGURE 4.
FIGURE 6 discloses a body of electrically polarizable material which is paritally polarized and has a net magnitude of polarization in a given direction which is substantially perpendicular to a surface of a thin layer of metal applied to a surface of the body.
FIGURE 7 is a plot of the resistance of a thin layer of metal applied to a surface of a body of electrically polarizable material with respect to the magnitude of polarization in a direction substantially perpendicular to the surface of the thin film of metal.
FIGURE 8 is a schematic view of another embodiment of the invention utilizing piezoelectric effects to alter the magnitude of polarization of the material employed.

Assuming then that the negative pulse of the time duration shown in FIGURE 4 is applied to the lead 32, a current shown in FIGURE 5 on the negative ordinant will flow through the charging resistor 44 and may be observed on the oscilloscope 46. The charge across the ferroelectric slab 11 will be sufficient to switch the ferroelectric slab 11 from its negative fully polarized state to its positive state, i.e., from point *g* to point *a* on the hysteresis curve shown in FIGURE 3. Thus, the dipoles of the ferroelectric material are aligned fully to provide a positive charge on the surface 17 of the ferroelectric slab 11. This causes an increase in the electron concentration or density at the surface of the thin layer or film of metal 14 over the concentration present when the ferroelectric slab was fully polarized in the other direction.

It is assumed, of course, that during this switching action, the switch 52 is opened. After the negative pulse shown in FIGURE 4 has been applied and the voltage output from the variable width pulse voltage source 20 has been terminated, the ferrolectric slab 11 will remain in its state of polarization at *a* and the electron concentration or density at the surface of the thin film or layer 14 that is in contact with the surface 17 will be at its highest state. The switch 52 may then be closed and a voltage may be read across the resistor 50 by the voltmeter 54. The resistance of the thin film or layer 14 may be calculated by summing the voltage drops through the series circuit including the battery 48, the resistor 50, the closed switch 52, the lead 15, the thin film or layer of metal 14 and the lead 16. This resistance of the thin layer of metal 14 may be plotted on the curve shown in FIGURE 7. The resistance of the thin layer or metal 14 will be at its lowest value when the polarization is at the point *a* shown in FIGURE 3, if the charge carriers of the metal employed, for example, gold, are electrons.

The switch 52 is then opened and the switch blades 26 and 28 are reversed so that the switch blade 28 is in contact with the contact 40 and the switch blade 26 is in contact with the contact 34. A pulse of equal magnitude to the previously applied pulse but of much shorter time duration is then applied by the variable width pulse voltage source 20. This pulse is shown in FIGURE 4 and is of opposite polarity from the previously applied switching pulse having a long time duration shown in FIGURE 4. This short pulse will alter or change the magnitude of polarization of the ferroelectric slab 11 in a direction substantially perpendicular to the surface 17 and to the surface of the thin film or layer of metal 14 along the dotted path between the points *a* and *b* of FIGURE 3. The magnitude of polarization will then become established at the point *b* after the positive pulse shown in FIGURE 4 and the positive charging current as shown in FIGURE 5 into the device and through the resistance 44 have been terminated.

The electrical polarization of the ferroelectric slab 11 will then have a net magnitude of polarization which is represented schematically in FIGURE 6. After the positive pulse shown in FIGURE 4 is terminated, the switch 52 is again closed and the resistance of the thin metal film or layer 14 is measured and it can be seen with respect to FIGURE 7 that the resistance has increased.

The whole cycle described above may then be repeated so that the magnitude of polarization of the ferroelectric slab 11 is brought into the positions *c* and *d* and on down the hysteresis curve shown in FIGURE 3 until the ferroelectric slab 11 has been completely reversed in polarization and is at point *g*. It can be seen with respect to FIGURE 7 that the resistance of the thin layer of metal 14 changes linearly with the magnitude of polarization and is proportional to it. The resistance has a maximum value when the polarization as shown in FIGURE 3 is at its maximum negative value, designated by the letter *g*, and has a minimum value when the polarization is at its maximum positive value as designated by the letter *a* in FIGURE 3. This is true for any metal, for example, gold, in which the charge carriers are electrons. For other metals in which the charge carriers are "holes," the same relationship of change of resistance with respect to polarization holds. In these metals, however, the resistance will be a maximum when the electrical polarization of the slab 11 is at point *a* and a minimum when it is at point *g*. One example of such a metal is iron.

It should be realized that the ferroelectric slab will remain in any state of polarization as designated by the letters *a*, *b*, *c*, *d*, and *e* in FIGURE 3 indefinitely after the positive pulses of voltage, shown in FIGURE 4, are terminated. This permits the measurement of the resistance or electrical resistivity of the thin layer or film of metal 14 at any time.

With respect to the dimensions and the material used as described above in relation to the device shown in FIGURE 1, the applied potential should be a few volts only. As an example, a slab of barium titanate, 0.005 cm. thick, can be switched from one fully polarized state to the other fully polarized state in one second at room temperature by the application of a 1-to-2-volt potential. For a thickness of 0.05 cm., a 10-volt potential is needed.

Of greatest practical interest are the changes in electrical resistivity where data on the metal gold have been obtained. For gold, the changes in resistance of evaporated films or layers 14 whose thicknesses range from 100 to 1300 angstroms were measured using both barium titanate and triglycine sulfate for the ferroelectric material. The results showed: (1) that the observed change in resistivity associated with complete switching of electrical polarization was proportional to the amount of surface charge provided by the ferroelectric and was also proportional to the amount of surface charge provided by the ferroelectric when it was positioned in intermediate states of electrical polarization; and (2) that the thinner films showed the greatest resistance changes. The table below gives the actual results obtained using barium titanate as the ferroelectric which was completely switched from one state of polarization to the other.

| Film thickness (angstroms) | Film resistance (ohms) | Resistance change (percent) |
|---|---|---|
| 100 | 25 | 2.3 |
| 200 | 1 | 1.3 |
| 300 | 0.7 | .9 |
| 500 | 0.3 | .15 |
| 1,300 | 0.15 | .033 |

The effects of temperature were also measured and found to be in agreement with the hypothesis that the resistivity changes are proportional to the amount of surface charge on the ferroelectric.

In connection with other physical properties besides the electrical resistance, the changes in the superconducting transition temperature have been measured. Here a triglycine sulfate cyrstal was used for the ferroelectric because of the ease by which the polarization direction can be controlled at liquid helium temperatures where the experiments must be performed. The evaporated electrodes 12 and 14 on the ferroelectric slab 11 shown in FIGURE 1 were both made of tin which is a superconductor with a transition temperature near 3.8° K. The appearance of superconductivity in each electrode was detected separately by connecting the electrode 14 through leads 15 and 16 and by connecting the electrode 12 through leads 13 and 18 to suitable electrical resistance measuring circuits, such as shown in FIGURE 2, while cooling or heating the specimen through the critical temtemperature range. The measurements showed that switching the ferroelectric from one state of complete polarization to the other produced a 1.4 millidegree shift in the transition temperature. This shift is about 20 times the shift measured earlier by Glover (Physical Review Letter 5, p. 248, 1960) who used the direct application of a large electric field to change the charge carrier density of tin. The film measured was 2½ times as thick as Glover's. Furthermore, this magnitude of shift is about what is to be expected for the electric fields associated with the surface charge produced in triglycine sulfate at 4° K.

All ferroelectric materials are also pyroelectric. That is, their electrical polarization is temperature dependent and can be changed or altered by heating or cooling. In this instance, one could measure temperature by reading the resistance of the thin film or layer of metal 14 deposited on the ferroelectric slab 11. It is also known that the polarization of ferroelectric materials is effected strongly by radiation, that is, neutrons, gamma rays, X-rays and electrons. Thus, a radiation detector can be made by measuring the resistance of the thin film or layer of metal 14 deposited on the ferroelectric slab 11 and subjecting the slab to radiation.

A practical embodiment of the two devices described above is shown in FIGURE 10. The transducer is in all respects the same as the transducer shown in FIGURE 1 and the polarization of the material may be set to any desired magnitude by the circuit shown in FIGURE 2. The device of FIGURE 1 would then be decoupled from the charging circuit shown in FIGURE 2 and a source of heat or radiation 60 would be brought in close physical relationship to the ferroelectric slab 11. The heat or radiation from this source would impinge on the ferroelectric slab 11 thus changing or altering the magnitude of polarization as a function of the amount of heat or radiation which falls upon it. The series circuit comprising the battery 48, resistor 50, switch 52, lead 15, thin layer or film of metal 14 and the lead 16 together with the voltmeter 54 positioned across the resistor 50 can be employed to measure the resistance of the thin film or layer of metal 14. As stated above, the change in resistance would be reflected by the reading of the voltmeter 54. Therefore, the device shown in FIGURE 10 could be used to measure temperature or as a radiation detector.

Figure 10:
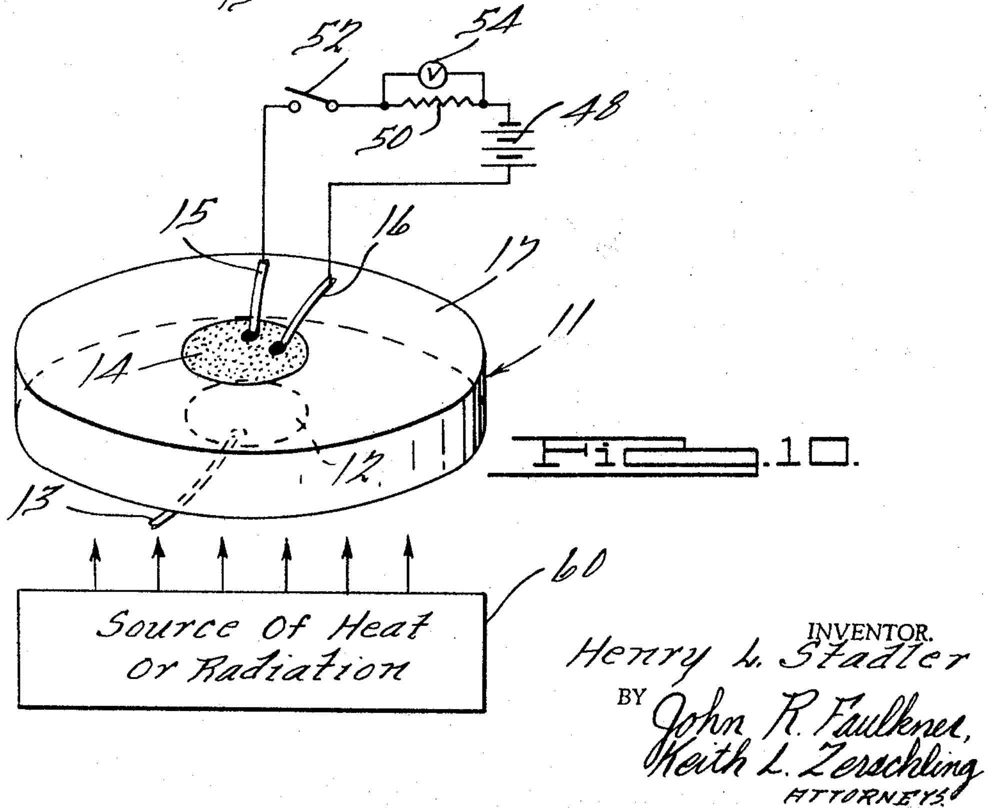
FIGURE 10 is a schematic view of another embodiment of the invention in which heat or radiation is employed to alter the magnitude of polarization of the material employed.

Any other pyroelectric material could also be used in the device of FIGURE 10 to measure temperature when it is subjected to a source of heat. For example, pyroelectric-nonferroelectric materials, such as lead titanate, could be employed. The slab 11 instead of being a ferroelectric material would be a pyroelectric-nonferroelectric material, but in this case, the magnitude of polarization could not be set by the circuit shown in FIGURE 2.

It is known also that the electrical polarization of piezoelectric materials can be altered or changed by pressure, either hydrostatic or along only one or two axes. Thus, the polarization of these materials is strain sensitive and a transducer can be made by reading the resistance of the thin film or layer of metal 14 deposited on a piezoelectric material by applying sound waves or other stresses to the material.

An example of a device employing principles discussed above is shown in FIGURE 9. It is similar in many respects to that shown in FIGURE 10 and as stated there, the magnitude of polarization of a ferroelectric material may be set to any desired level by the circuit shown in FIGURE 2. Similarly, if a piezoelectric material that is also ferroelectric is employed in FIGURE 9, the magnitude of polarization may be set to any desired level by the circuit shown in FIGURE 2.

Figure 9:
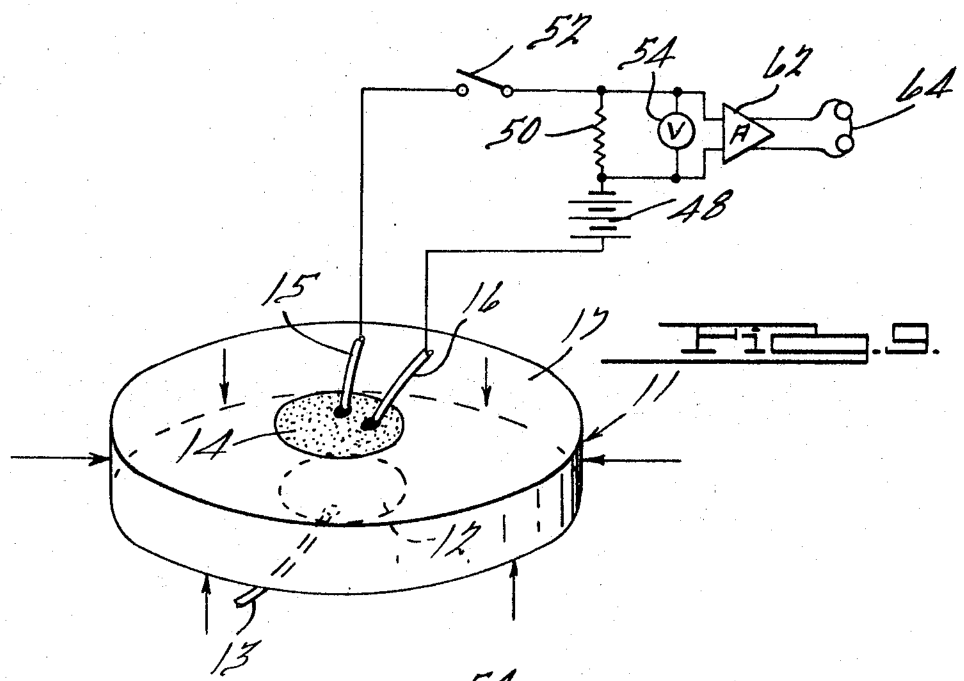
FIGURE 9 is a schematic view of another embodiment of the invention, which also utilizes piezoelectric effects to alter the magnitude of polarization of the material employed.

When forces indicated by the arrows in FIGURE 9 are applied to the piezoelectric slab, the magnitude of polarization is changed or altered and hence the resistance of the thin film or layer of metal 14 is changed or altered. These changes are a function of the strain produced in the material due to the applied forces and this change may be read on the voltmeter 54 when the switch 52 is closed.

In addition, an amplifier 62 and a sound receiver 64 are coupled to the resistor 50, with the amplifier 62 amplifying the signal appearing across the resistor 50 which is proportional to or a function of the resistance of the thin layer or film of metal 14. The amplifier 62 amplifies these electrical signals and the output thereof is applied to the receiver 64. This transducer thus tranduces the forces or stresses applied to the crystal which may include sound waves of other varying forces which can be read from the voltmeter 54 or can be heard in the receiver 64. The device of FIGURE 9 may be considered to be a very sensitive microphone.

A device similar to that shown in FIGURE 9 is shown in FIGURE 8 and any piezoelectric material could also be used. For example, a nonpyroelectric piezoelectric, such as quartz, could be used in the device of FIGURE 8 as well as a nonoferroelectric pyroelectric material, for example, lead titanate. The polarization of this last mentioned material can be changed by any strain except hydrostatic strain, that is, strain caused by pressure or chances in pressure applied equally to all surfaces thereof. Therefore, if a force as shown by the arrows in FIGURE 8 is directed into a surface of the slab 11, the strain produced in the body of material will cause a change in the resistance of the thin layer or film of metal 14 and this output, as stated in relation to FIGURE 9, may be read across the voltmeter 54 or may be heard in the receiver 64. It is apparent, therefore, that the transducers as shown in FIGURES 8 and 9 could be employed as ultrasensitive microphones.

Any altering of the electrical polarization of any of the materials described above will result in a change in the physical properties of the thin layer or film of metal 14 as described earlier in the specification, that is, its electrical resistivity, the transmission and reflectance of light from the thin layer of metal, the critical temperature and magnetic field for the transition from normal to superconducting states in a metal capable of superconductivity, the Hall voltage of the metal, the Mossbauer effect of the metal, and the Curie temperature of the metal that is a ferromagnet.

The present invention thus provides a very sensitive transducer utilizing electrically polarizable material in which a thin layer or film of metal is deposited on a surface of the electrically polarizable material. The electron concentration or density on the surface of the thin layer of metal is responsively altered upon altering the magnitude of polarization of the body of electrically polarizable material in a direction substantially perpendicular to the surface of the thin layer of metal thereby altering the above mentioned physical properties.

The transducers described in the specification and shown in the drawings may be used as a computer memory element in which the information is stored as a function of the direction of polarization in a ferroelectric material or other electrically polarizable material and may then be read out nondestructively and very rapidly by measuring the resistance of the thin film of metal deposited on the body of electrically polarizable material. Optical display devices in which the reflectivity or transmission characteristics of a thin layer or film of metal are changed by altering the electrical polarization of electrically polarizable material may also be constructed. An amplifier may also be constructed with the apparatus of this invention when the body of electrically polarizable material is a ferroelectric. In the amplifier the input voltage is used to control the magnitude of polarization of the ferroelectric body of material, while the output employs a change in curent through the thin layer of metal deposited on the ferroelectric material. Operation of such an amplifier near the Curie temperature yields the fastest response and the greatest change in polarization per volt of input voltage.

The invention disclosed will have many modifications which will be apparent to those skilled in the art in view of the teachings of this specification. It is intended that all modifications which fall within the true spirit and scope of this invention be included within the scope of the appended claims.

What is claimed is:

1. A transducer comprising a body of electrically polarizable material, the electrical polarization thereof being alterable, a thin layer of metal having a surface positioned in intimate contact with a surface of said body and having an electron concentration, means coupled to said body for polarizing and for altering the magnitude of polarization of said body in a direction substantially perpendicular to the surface of said thin layer of metal, said electron concentration at the surface of said thin layer of metal being responsively alterable upon altering the magnitude of polarization of said body in the direction substantially perpendicular to said surface of said thin layer of metal, whereby a physical property of said thin layer of metal is controllably altered.

2. The combination of claim 1 in which said body of electrically polarizable material is a body of ferroelectric material.

3. The combination of claim 1 in which said body of electrically polarizable material is a body of piezoelectric material.

4. The combination of claim 1 in which said body of electrically polarizable material is a body of pyroelectric material.

5. The combination of claim 2 in which said means coupled to said body for polarizing and for altering the magnitude of polarization of said body in a direction substantially perpendicular to the surface of said thin layer of metal comprises electrically conductive means positioned in engagement with said body including said thin layer of metal.

6. The combination of claim 2 in which said means coupled to said body for polarizing and for altering the magnitude of polarization of said body in a direction substantially perpendicular to the surface of said thin layer of metal comprises a source of radiation for radiating said body with radiation comprising neutrons, gamma rays, X-rays and electrons.

7. The combination of claim 3 in which said means coupled to said body for polarizing and for altering the magnitude of polarization of said body in a direction substantially perpendicular to the surface of said thin layer of metal comprises means for applying a varying mechanical force to said body thereby altering the strain in said body.

8. The combination of claim 4 in which said means coupled to said body for polarizing and for altering the magnitude of polarization of said body in a direction substantially perpendicular to the surface of said thin layer of metal comprises heating means for altering the temperature of said body.

9. A transducer comprising a body of ferroelectric material, electrically conductive means for selectively electrically altering the magnitude of polarization of said body in a specified direction, a thin layer of metal adhering to a surface of said body that is substantially perpendicular to said specified direction, said electrically conductive means including said thin layer of metal, and the electrical resistance of said thin layer of metal being responsively alterable upon altering the magnitude of polarization in the ferroelectric body in said specified direction.

References Cited

UNITED STATES PATENTS

| | | | |
|---|---|---|---|
| 2,540,187 | 2/1951 | Cherry | 317—262 |
| 2,924,814 | 2/1960 | Simpson | 317—262 |
| 2,940,035 | 6/1960 | Lefkowitz | 317—262 |

JAMES D. KALLAM, *Primary Examiner.*

U.S. Cl. X.R.

317—262